(12) United States Patent
Volpato et al.

(10) Patent No.: US 10,040,040 B2
(45) Date of Patent: Aug. 7, 2018

(54) METHOD AND HIGH-PRESSURE MIXING DEVICE FOR THE CO-INJECTION OF POLYMERIC COMPONENTS

(71) Applicant: AFROS S.P.A., Milan (IT)

(72) Inventors: Marco Volpato, Milan (IT); Maurizio Corti, Milan (IT)

(73) Assignee: AFROS S.P.A., Milan (IT)

( * ) Notice: Subject to any disclaimer, the term of this patent is extended or adjusted under 35 U.S.C. 154(b) by 724 days.

(21) Appl. No.: 14/580,573

(22) Filed: Dec. 23, 2014

(65) Prior Publication Data

US 2015/0174540 A1 Jun. 25, 2015

(30) Foreign Application Priority Data

Dec. 23, 2013 (IT) .......................... MI2013A002189

(51) Int. Cl.
*B29B 7/76* (2006.01)
*B01F 13/06* (2006.01)
(Continued)

(52) U.S. Cl.
CPC .......... *B01F 13/06* (2013.01); *B01F 15/0254* (2013.01); *B01F 15/0279* (2013.01);
(Continued)

(58) Field of Classification Search
CPC .......... B29B 7/76; B29B 7/80; B29B 7/7663; B29B 7/805; B29B 7/7684; B29B 7/7668;
(Continued)

(56) References Cited

U.S. PATENT DOCUMENTS

| 4,332,335 A | 6/1982 | Fiorentini |
| 4,608,233 A | 8/1986 | Fiorentini |

(Continued)

FOREIGN PATENT DOCUMENTS

| DE | 3427327 A1 * | 2/1985 |
| DE | 9315493 | 12/1993 |

(Continued)

OTHER PUBLICATIONS

Search Report of Italian Application MI20132189 dated Aug. 6, 2014.

*Primary Examiner* — Charles Cooley
(74) *Attorney, Agent, or Firm* — Silva Salvadori, P.C.; Silvia Salvadori

(57) ABSTRACT

A method and high-pressure mixing device for co-injection of polymeric reactive components, in particular for polyurethane and epoxy mixtures. The polymeric components are supplied in a common pressure chamber where they flow at a same pressure and in an unmixed state into a forwardly converging fore portion of the pressure chamber, and through a settable co-injection orifice to be co-injected, in the unmixed state, into a mixing chamber transversely oriented to the pressure chamber. The settable co-injection orifice consists in an elongated restriction that longitudinally extends on a side wall of the mixing chamber orthogonally oriented to an intersecting the forwardly converging fore portion of the pressure chamber; a first cleaning member and a second cleaning member are sequentially reciprocable in the pressure chamber to eject the remaining unmixed polymeric components, respectively in the mixing chamber to eject the remaining mixture, and stop elements are provided to set an open section of the elongated restriction, by adjustably stopping the fore end of the cleaning member for the mixing chamber, in respect to the same elongated restriction of the co-injection orifice.

18 Claims, 11 Drawing Sheets

(51) Int. Cl.
*B29B 7/80* (2006.01)
*B29C 67/24* (2006.01)
*B01F 15/02* (2006.01)

(52) U.S. Cl.
CPC .......... *B29B 7/7668* (2013.01); *B29B 7/7694* (2013.01); *B29B 7/805* (2013.01); *B29C 67/246* (2013.01); *B01F 2215/0049* (2013.01)

(58) Field of Classification Search
CPC ................ B29B 7/7694; B01J 19/0073; B01J 2219/00761; B29C 44/1271; B29C 67/246; B29K 2075/00; B01F 13/06; B01F 15/0279; B01F 15/0254; B01F 2215/0049
USPC ......... 366/159.1, 162.4, 162.5, 167.1, 173.1, 366/138; 422/131, 133–135; 239/498, 239/500, 590.3, 402.5, 403, 477, 487
See application file for complete search history.

(56) References Cited

U.S. PATENT DOCUMENTS

| | | | | |
|---|---|---|---|---|
| 4,721,391 A | * | 1/1988 | Bauer | ................... B29B 7/7621 264/328.6 |
| 4,802,770 A | | 2/1989 | Fiorentini | |
| 5,164,162 A | * | 11/1992 | Ridenour | ............. B29B 7/7668 137/883 |
| 5,277,567 A | * | 1/1994 | Bauer | ................... B29B 7/7668 264/328.19 |
| 5,453,249 A | * | 9/1995 | Proksa | .................. B29B 7/7668 222/136 |
| 5,498,151 A | | 3/1996 | Nennecker | |
| 6,079,867 A | * | 6/2000 | Fiorentini | ............. B29C 67/246 366/159.1 |
| 7,455,446 B2 | * | 11/2008 | Corti | ..................... B29B 7/7668 366/162.5 |
| 9,308,512 B2 | * | 4/2016 | Fiorentini | ............ B29C 44/1271 |
| 9,731,267 B2 | * | 8/2017 | Fiorentini | ............ B01J 19/0073 |
| 2001/0001602 A1 | | 5/2001 | Bonansea et al. | |
| 2006/0104155 A1 | * | 5/2006 | Corti | ..................... B29B 7/7668 366/164.4 |
| 2008/0094936 A1 | | 4/2008 | Corti | |
| 2010/0137508 A1 | * | 6/2010 | Corti | ..................... B29B 7/7636 524/590 |
| 2015/0174540 A1 | * | 6/2015 | Volpato | ................. B29B 7/7668 366/162.5 |

FOREIGN PATENT DOCUMENTS

| | | |
|---|---|---|
| EP | 0391152 | 10/1990 |
| EP | 0447883 A1 * | 9/1991 |
| EP | 1992466 | 11/2008 |
| WO | 2004041494 | 5/2004 |

* cited by examiner

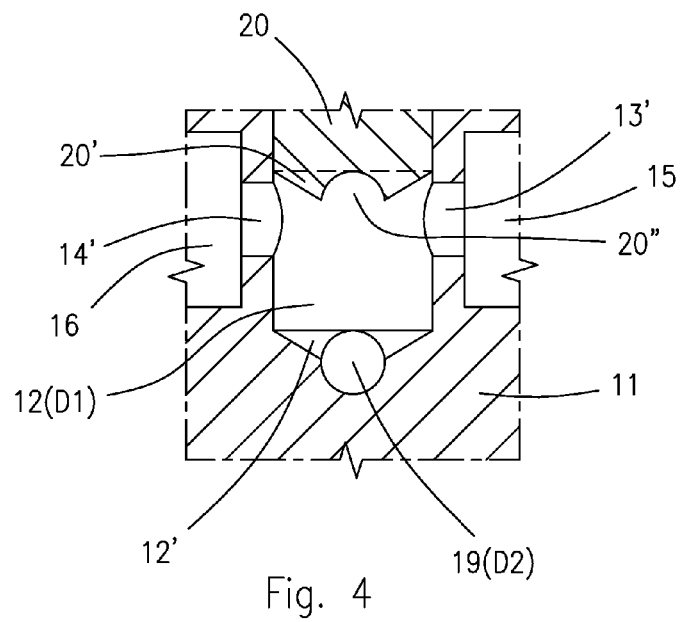
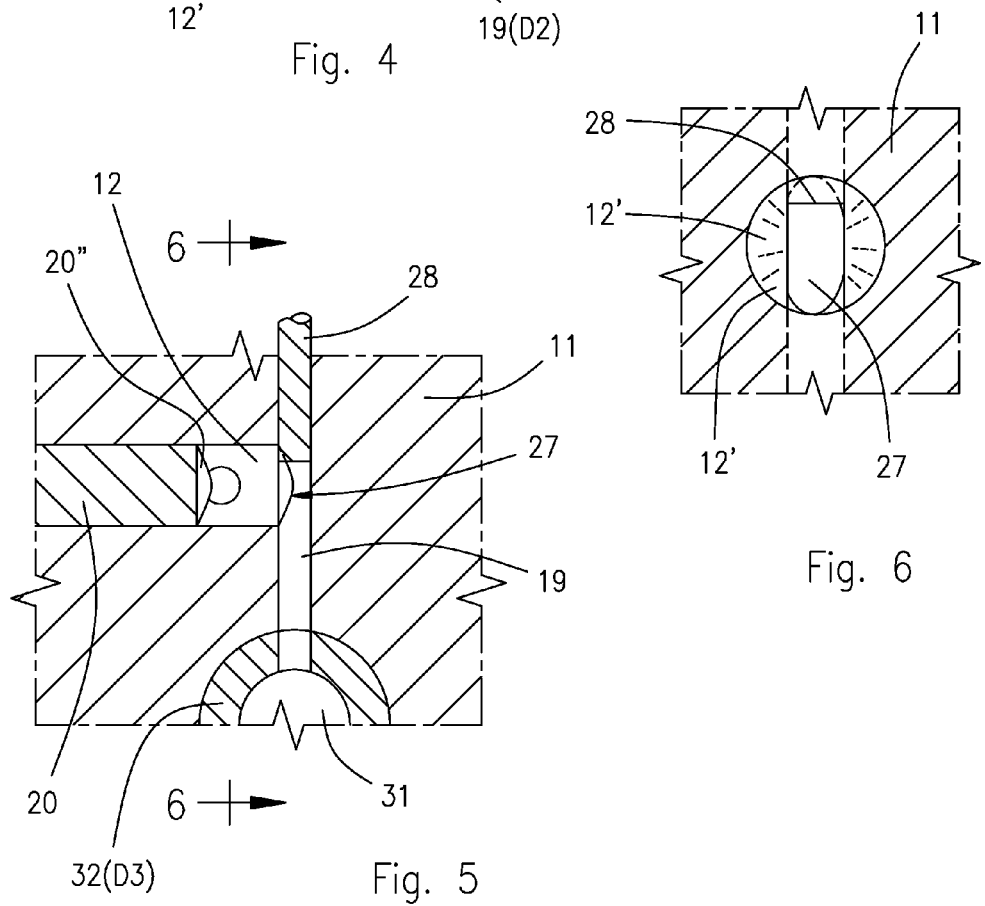

METHOD AND HIGH-PRESSURE MIXING DEVICE FOR THE CO-INJECTION OF POLYMERIC COMPONENTS

This application is U.S. Non-Provisional Application which claims priority to and the benefit of Italian Application No. MI2013A002189 filed on Dec. 23, 2013, the content of which is incorporated herein by reference in its entirety.

BACKGROUND OF THE INVENTION

The present invention refers to certain improvements to a method and a high-pressure self-cleaning mixing device for co-injecting and mixing polymeric reactive components, in particular for preparing polyurethane or epoxy mixtures, disclosed in a preceding international application WO 2004/041494 and corresponding granted EP 1560687.

PRIOR ART

High-pressure self-cleaning mixing devices for polymeric reactive components, for example polyurethane components, are well known from U.S. Pat. No. 4,332,335, U.S. Pat. No. 4,608,233 and U.S. Pat. No. 4,802,770, U.S. Pat. No. 5,498,151 and EP 1.992.466; devices of this type are widely used for producing molded articles or for dispensing polyurethane mixture for rigid or flexible foams. According to this mixing technology, two or more polymeric reactive components, for example a polyol and an isocyanate, are supplied at high-pressures, in the order of 100-150 bar (10-15 MPa) or higher, and separately injected into a mixing chamber where the two jets impinge one another frontally at high speed and with great kinetic energy to be intimately mixed, and in which the resulting mixture is dispensed into a mold or poured onto a substrate.

International application WO 2004/041494 aimed to improve this technology by proposing to separately supply the single reactive components in a common pressure chamber, where they flow at a same high-pressure and in a substantially unmixed condition to a settable orifice, to be co-injected in said unmixed condition into a mixing chamber axially aligned to the common pressure chamber of the mixing device. A first member for cleaning and recirculating the polymeric components is reciprocable to the common pressure chamber and is coaxially arranged to a second cleaning member for the mixing chamber, slidably arranged in a longitudinal bore of the first cleaning member, and in which the fore end of the second cleaning member is suitably configured to form, with a rear edge of the mixing chamber, one or more angularly spaced apart restricted orifices for the co-injection of the polymeric components in the unmixed condition, into the mixing chamber of the device.

The cleaning member for the common pressure chamber and the cleaning member for the mixing chamber are connected to respective hydraulic actuators to be sequentially moved between a retracted position to open the mixing device, and an advanced closure position in which the first cleaning member, which is configured with side slots allows the recirculation of the polymeric components.

A high-pressure self-cleaning mixing device according to WO2004/041494, which is the prior art closest to the present invention, has proved to be extremely innovative compared with conventional high-pressure mixing devices previously known, because it allows to use and maintaining for a time the turbulence generated in the co-injected unmixed reactive components to improve mixing efficiency, both at changing of the flowrates and during mixing transient phenomena. Further advantages of this type of device consist of a substantial reduction of the pressures for feeding the reactive components in the common pressure chamber, compared to the comparatively higher pressures required in the prior known mixing devices, in a better control of the stoichiometric mixing ratios, and in a consequent energy saving.

Despite the good operation of a mixing device according to WO 2004/041494, it was found that in the case of comparatively reduced flowrates, with mixing chambers of very small dimensions, the coaxial arrangement and sliding of the first valve and cleaning member for recirculating the components and cleaning the common pressure chamber, and of the second cleaning member for the mixing chamber, which is slidably movable in a bore of the first cleaning member, entailed certain drawbacks that the present invention intends to remedy.

In the embodiment of the mixing device according to WO 2004/041494, the second cleaning member slides inside the first cleaning member which determines most of the length thereof: having to reduce the diameters of the pressure and mixing chambers and of the cleaning members to process reduced flowrates down to a few grams/second, the excessive free inflexion length of the second cleaning member becomes critical in relation to the force necessary to command the closure and ejection from the mixing chamber of the reacted residual polymeric mixture. Further, for reasons of overall dimensions and simplicity, the hydraulic actuators have been mutually integrated to provide only three control chambers, one of which is consisting of an intermediate control chamber that is common to both actuators, selectively supplied with pressurized oil to move backward the second cleaning member of the mixing chamber and open the co-injection orifice, respectively for moving forward the first cleaning and valving member for recirculation of the polymeric components and cleaning the common pressure chamber.

In a mixing device of this type, in certain cases a difficulty was found in controlling the retracted position of the cleaning member for the mixing chamber, and consequently controlling and setting the opening of the co-injection orifice.

In fact, when the apparatus has to be opened and the reactive mixture has to be dispensed, the pressure in the rear chamber of the hydraulic actuator relative to the cleaning member for the mixing chamber first has to be discharged, and simultaneously pressurized oil has to be supplied into the intermediate chamber which is common to both actuators, to have the aforesaid cleaning member of the mixing chamber retracted, simultaneously maintaining the valve and cleaning member of the pressure chamber in the advanced closure position; subsequently, the pressure in the intermediate chamber has to be discharged and pressurized oil has to be supplied to the fore chamber of the hydraulic actuator of the first valve and cleaning member to open the common pressure chamber and the co-injection orifice or orifices.

In these conditions, during dispensing of the mixture, there is no pressure in the intermediate chamber and in the rear control chamber of the actuator for the second cleaning member of the mixing chamber; the second cleaning member is thus substantially free to slide, so that small pressure perturbations on the discharge side for the oil, or dragging forces acting by a Venturi effect on the tip of the second cleaning member caused by the flow of the polymeric components whilst they are co-injected, tend to entrain forward the cleaning member of the mixing chamber and to change the restricted section of the co-injection orifice; thus the pressure in the common pressure chamber and the mixing degree of reactive components are substantially altered. Due to axial disposition of the pressure and mixing chambers, and coaxial arrangement of the cleaning members, it is further difficult to gradually vary the restricted section of the co-injection orifice, or orifices, to maintain adjusted the pressure in the common pressure chamber during a flowrate change.

Providing a similar mixing device with a suitable system for stopping and positioning the cleaning member of the mixing chamber and throttling the co-injection orifice, or orifices, in addition to entailing an extreme constructional and functional complication, in particular during the initial adjusting and fine setting steps would hardly allow interventions to adjust the retracted position of the cleaning member for the mixing chamber and throttling the co-injection orifice orifices; consequently it would make it difficult to adjust the pressure in the common pressure chamber during operation of the mixing device.

OBJECTS OF THE INVENTION

There is thus a need to find a new and different solution suitable for eliminating the aforementioned drawbacks and providing at the same time an improvement enabling all the advantages arising from a direct co-injection of the polymeric components in an unmixed condition to be maintained.

The main object of the present invention is thus to improve further this technology, and the mixing device to eliminate the previously mentioned drawbacks by a solution that enables the kinetic energy and the turbulence of the jet of the polymeric components whilst they are co-injected into the mixing chamber, and the mixing degree thereof to be increased, and the dimensions of the mixing chamber to be comparatively reduced without compromising the free inflection length of the cleaning member.

A further object of the invention is to provide a high-pressure self-cleaning mixing device for polymeric reactive components, by means of which it is possible to control and maintain with extreme precision an open position of the cleaning member for the mixing chamber, and accordingly varying, during adjustment of the flowrates, the pressure of the co-injected polymeric components by an extremely simple solution that makes it possible to modify, in a controlled manner, the throttling of a co-injection orifice both during the setting of the mixing device and during the feeding and co-injection steps of the polymeric components.

A still further object of the invention is to provide a high-pressure self-cleaning mixing device for polymeric reactive components, of the previously mentioned type, by which it is possible to use a mixing chamber having a comparatively small cross-section, for example with a diameter comprised between 0.5 mm and 3.5 mm, when the diameter/length ratio of the cleaning member for the same mixing chamber would constitute a cause of instability to axial loads.

SHORT DESCRIPTION OF THE INVENTION

In general terms, the problem was solved by modifying the configuration and the geometrical and reciprocal disposition of the common pressure chamber and of the mixing chamber, by co-injecting the polymeric components in a non-mixed state, through a settable restriction of an adjustable co-injection orifice, in a mixing chamber intersecting a convergent or forwardly tapering end portion of the pressure chamber.

In particular, according to the invention, a method has been provided for mixing a first and at least a second polymeric reactive component by a self-cleaning high-pressure mixing device comprising a pressure chamber configured with a forwardly converging fore portion in fluid communication with a mixing chamber through a settable co-injection orifice;

comprising the steps of:

feeding the first and at least the second reactive components into the pressure chamber maintaining the reactive components inside the pressure chamber at a same pressure and in an unmixed state;

flowing the reactive components at said pressure and in the unmixed state, into the pressure chamber and into the forwardly converging fore portion to increase the flow velocity;

configuring the co-injection orifice in the form of an elongated restriction longitudinally extending to the mixing chamber transversely oriented and intersecting the forwardly converging fore portion of the pressure chamber;

adjusting the pressure of the unmixed reactive components in the pressure chamber, setting an open section of the elongated restriction of the co-injection orifice by adjusting, in respect to the same co-injection orifice, the fore end position of the second cleaning member at the retracted condition thereof; and co-injecting the unmixed reactive components into the mixing chamber, causing a pressure drop and mixing the reactive components, while they are flowing through the set open section of the co-injection orifice and into the mixing chamber of the mixing device; and ejecting the remaining unmixed reactive components from the pressure chamber and from the forwardly converging fore portion, and ejecting a remaining mixture from the mixing chamber, by first and respectively second cleaning members having a fore end, the cleaning members being reciprocable between a retracted and an advanced condition in the pressure, respectively in the mixing chamber of the mixing device.

According to another aspect of the invention, a self-cleaning high-pressure mixing device has been provided suitable for mixing polymeric reactive components comprising:

a cylindrical pressure chamber having a diameter and a forwardly converging end portion;

a cylindrical mixing chamber having a diameter comparatively smaller than the diameter of the pressure chamber;

the forwardly converging fore portion of the pressure chamber being in fluid communication with the mixing chamber through a settable co-injection orifice;

first and second cleaning members each having a fore end, which are reciprocable in the pressure chamber respectively in the mixing chamber between a retracted and an advanced condition; and control means to sequentially reciprocate the first and second cleaning members;

the settable co-injection orifice consisting of an elongated restriction longitudinally extending on a side wall of the mixing chamber transversely oriented to and intersecting the forwardly converging fore portion of the pressure chamber; and comprising adjustable stop means configured to provide an open section of the elongated restriction to adjust the pressure of the unmixed reactive components in the pressure chamber, by setting the fore end of the second cleaning member in the retracted condition, in respect to the elongated restriction of the co-injection orifice.

SHORT DESCRIPTION OF THE DRAWINGS

The method and some preferential embodiments of mixing devices according to the present invention will be disclosed below with reference to the attached drawings, in which:

FIG. 4 is an enlarged particular of FIG. 3;

FIG. 5 is an enlarged sectional view according to line 5-5 of FIG. 3;

FIG. 6 is a section according to line 6-6 of FIG. 5;

DETAILED DESCRIPTION OF THE INVENTION

Figure 1:
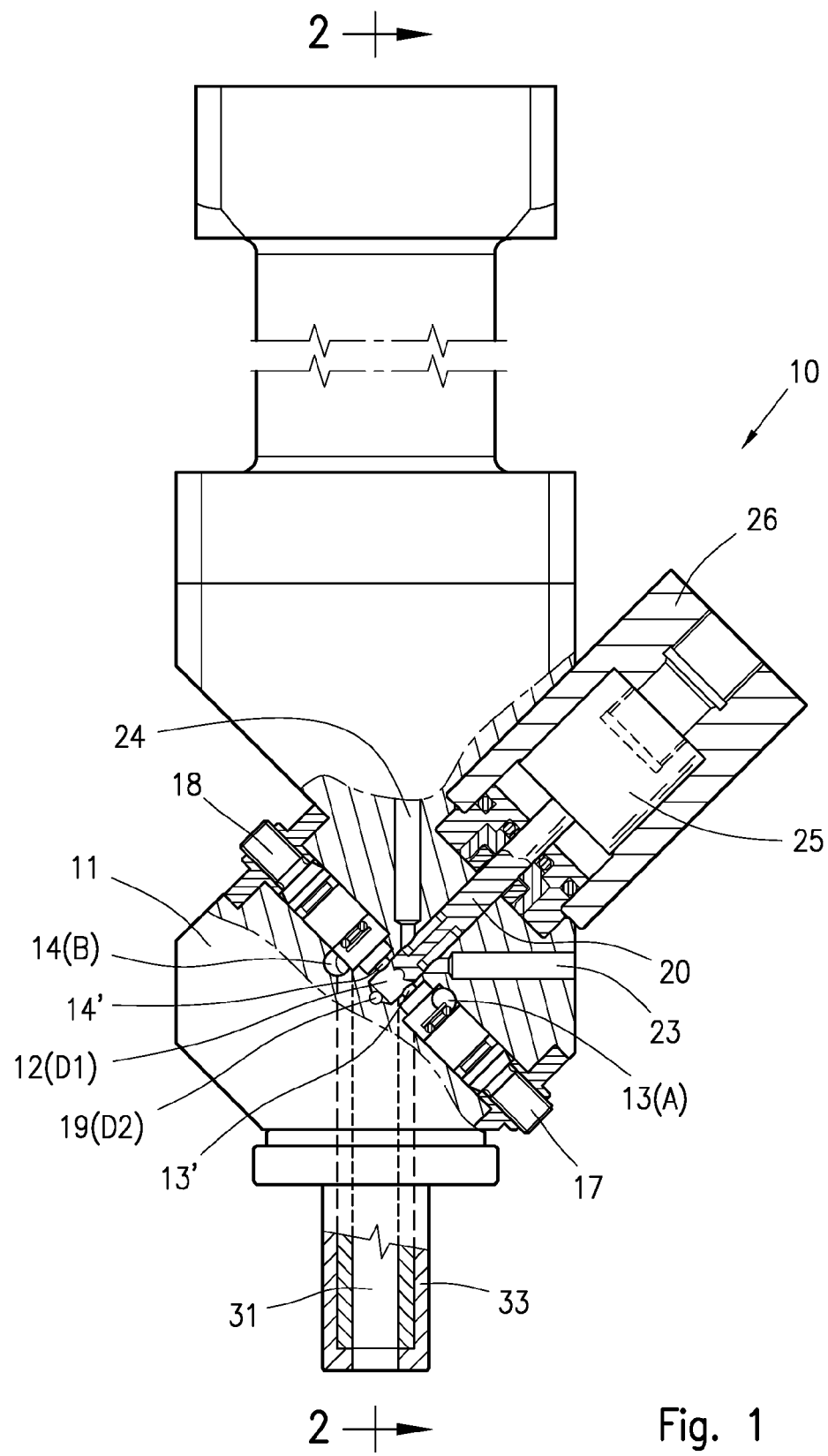
FIG. 1 is a partially sectioned overall view of a first embodiment of a mixing device according to the invention.

With reference to FIGS. 1 to 6, a first preferential embodiment of a self-cleaning high-pressure mixing device and high-pressure mixing method according to the present invention will be disclosed.

As shown, the mixing device 10 comprises a body 11 provided with a first cylindrical chamber 12, also referred to as pressure chamber, in which a first A and at least a second B chemically reactive polymeric components, for example a polyol and an isocyanate are simultaneously supplied and maintained in a substantially unmixed condition, or state, at a same pressure, whilst they flow through a settable restriction of a co-injection orifice 27, to be co-injected at a same high-pressure in the unmixed state into a cylindrical mixing chamber 19 to form a resulting polymeric mixture.

For the purpose of the present invention, the term "pressure chamber" means a large feeding chamber in which the polymeric reactive components are firstly fed and maintained in an unmixed state, at a same high-pressure equal to or higher than 40-60 bar (4-6 MPa) and very close to the pumping high-pressure (from 2 to 25 bar due to the pressure drop caused by the feeding the piping), and in which the polymeric reactive components are flowing at the same high-pressure, in an unmixed state, toward a restricted open section of a co-injection orifice which can be set to allow the unmixed reactive components to be co-injected at a same pressure through a restriction, causing a pressure drop through the co-injection orifice higher than 40-60 bar (4-6 MPa) and successively mixed into a smaller mixing chamber.

Therefore, the "pressure chamber" according to the present invention, substantially differs from a mixing chamber comparatively smaller than a second chamber or discharge conduit of a conventional high-pressure mixing device in which the polymeric reactive components are firstly injected into the mixing chamber in which the pressure is much lower that the feeding pressure (from 60 to 200 bar –6.20 MPa), where they are mixed by impingement and flowing at a very low pressure, lower than 4-5 bar (0.4-0.5 MPa) compared to the 40-60 bar (4-6 MPa) or higher of the pressure chamber according to the present invention.

Figure 3:
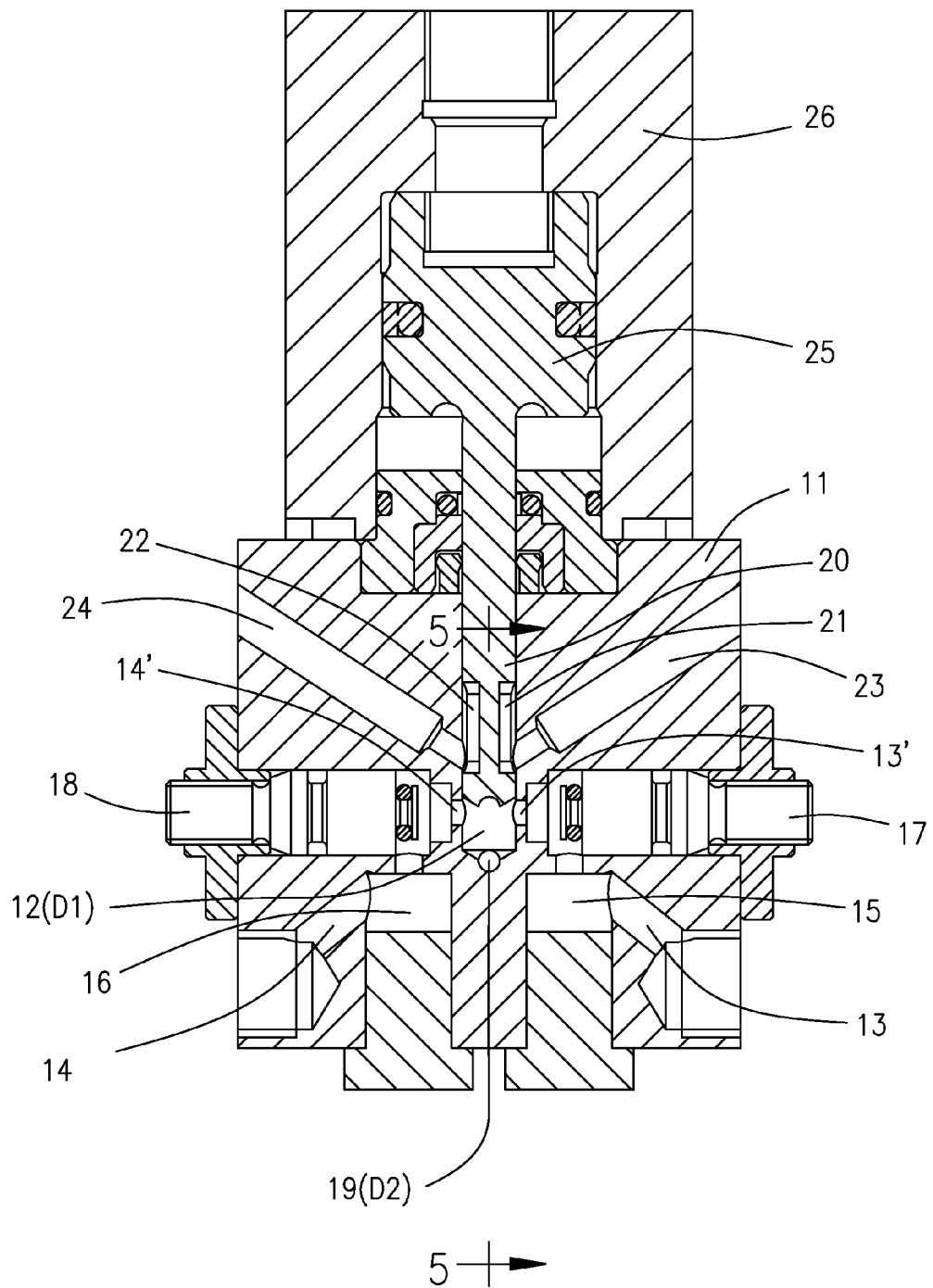
FIG. 3 is a cross sectional view of FIG. 1.

As shown in FIGS. 3 and 4, the polymeric components A and B are supplied simultaneously to the pressure chamber 12 through respective inlet conduits 13 and 14 of a respective feeding line that, through an intermediate chamber 15, 16, communicate with respective inlet holes 13' and 14'; still in FIG. 3 plugs 17 and 18 have been indicated, that are screwably moveable between a retracted position of FIG. 3 in which open the inlet holes 13' and 14' for the polymeric components A and B, and an advanced or closing position, not shown. The plugs 17 and 18 are initially used to conduct a check for setting the metering pumps for the polymeric components A, B, for example by closing the inlet hole of one of the polymeric components, leaving the other inlet hole open, to separately feed a stoichiometric quantity of each single polymeric component, measuring the quantity by weight.

Inside the pressure chamber 12, consisting of a cylindrical hole having a diameter D1 comparatively greater than the diameter D2 of a mixing chamber 19, for example having a cross section that is almost twice the cross-section of the mixing chamber 19, a first cleaning and valving member 20 is reciprocated between a retracted and an advanced position; the cleaning member 20 is configured with longitudinal slots 21, 22 (FIG. 3) which in the advanced position of the valve member 20, put into communication each inlet hole 13', 14' of each single polymeric components A, B, with a respective recirculating conduit 23 and 24.

The valving member 20, in addition to the function of opening/closing the inlet holes 13', 14', and recirculating the polymeric components A, B, also performs a complementary function as first cleaning member, to eject into the mixing chamber 19 the unmixed components A and B that remain in the common pressure chamber 12 at the end of each mixing step. The reciprocal movement between the retracted position and the advanced position of the first cleaning and valving element 20, as shown in FIGS. 1 and 3, is provided by the piston 25 of a first hydraulic actuator 26, to open the inlet holes 13', 14' and the elongated restriction of the co-injection orifice 27 in the retracted position and to close the co-injection orifice 27, ejecting the residual unmixed components when moved in the advanced position of said cleaning member 20.

In the example in FIGS. 1-6 the pressure chamber 12, via a settable restriction or narrowed co-injection orifice 27 of elliptical shape, FIGS. 5 and 6, opens towards a transversely oriented mixing chamber 19 having a diameter D2 that is comparatively lower than the diameter D1 of the pressure chamber 12, for example equal to at least one half said diameter D1 of the pressure chamber 12; the angular orientation and the transversal arrangement of the longitudinal axis of the mixing chamber 19, with respect to the longitudinal axis of the pressure chamber 12, can be any depending on the specific constructional and functional requirements of the mixing device. In the example in FIGS. 1-6, the mixing chamber 19 is arranged orthogonally, at 90°, with respect to the pressure chamber 12; nevertheless, it cannot be ruled out that the mixing chamber 19 can be differently arranged and angularly oriented, maintaining a condition of partial or total interference with a forwardly convergent or conical portion 12' at the fore end of the common pressure chamber 12, as shown in FIGS. 4 and 5.

Figure 2:
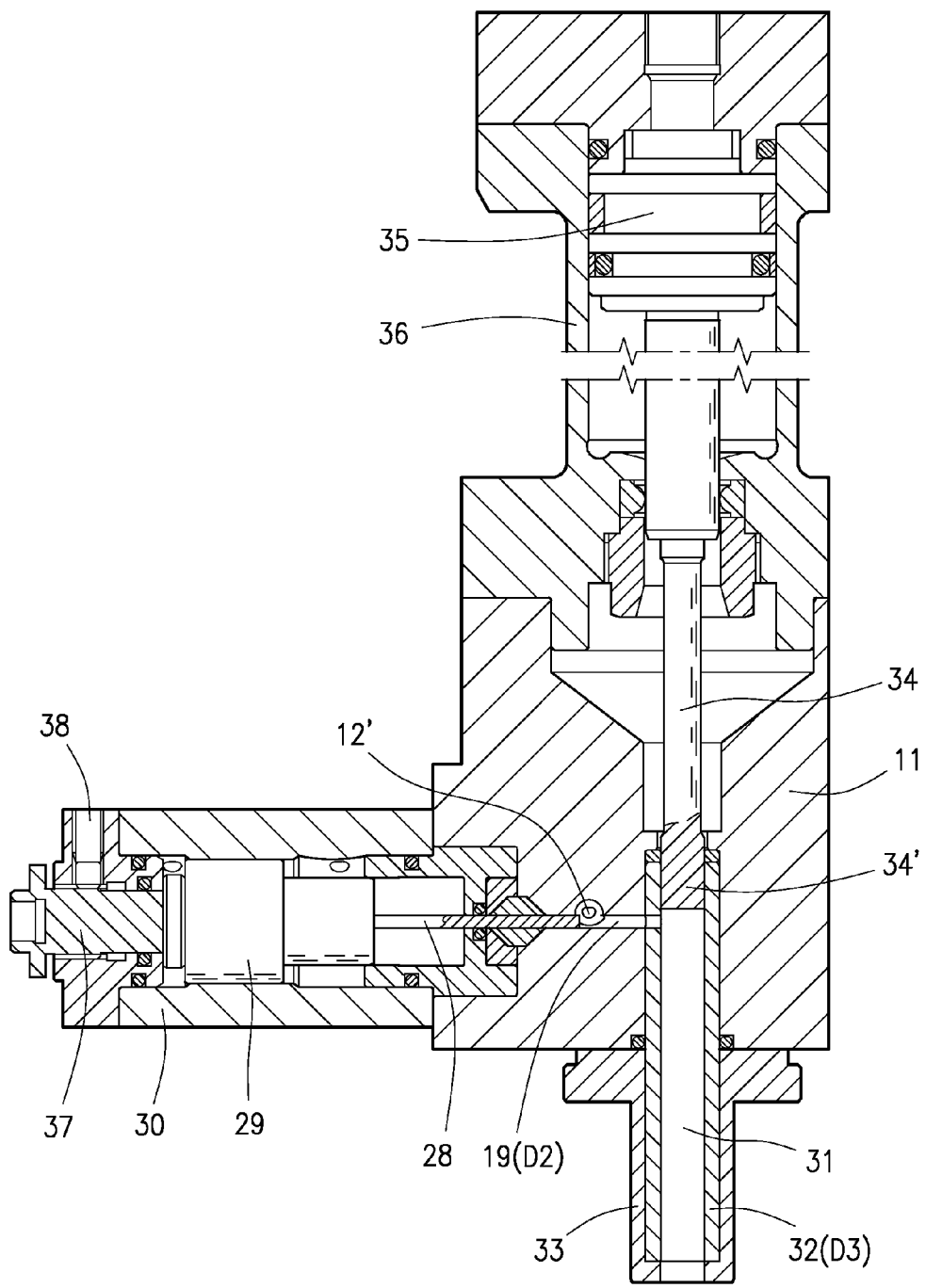
FIG. 2 is a longitudinal sectional view according to line 2-2 of FIG. 1.

Longitudinally to the mixing chamber 19 in which the components A, B are co-injected at high speed and high kinetic energy through the set aperture of the orifice 27, a second cleaning member 28 slides, operatively connected to the piston 29 of a second hydraulic actuator 30, to be moved between a settable retracted position, shown in FIG. 2, in which opens the mixing chamber 19 towards a delivery conduit 31, and in which throttles the elongated restriction of the co-injection orifice 27, and an advanced position forward the co-injection orifice 27 in which closes the mixing chamber 19 towards the delivery conduit 31, ejecting the resulting residual mixture.

Still with reference to the example of FIGS. 1-6, the delivery conduit 31 can be differently configured and oriented with respect to the mixing chamber 19; in the case shown, the delivery conduit 31 consists of a cylindrical bush 32 the internal diameter D3 of which is comparatively greater and at least twice greater than the diameter D2 of the mixing chamber 19. In particular, in the case shown the cylindrical bush 32 is oriented orthogonally at 90° to the mixing chamber 19; the bush 32 is retained in a seat of the body 11 by a sleeve 33. Both the sleeve 33 and the bush 32 are removably fastened to the body 11 of the device to permit suitable maintenance and/or replacement operations.

Inside the delivery conduit 31 a third cleaning member slides, for example consisting of a stem 34 provided with an enlarged piston head 34', operatively connected to the piston member 35 of a third hydraulic actuator 36. A suitable hydraulic circuit operatively connected to a control unit of the entire mixing device, coordinates the correct sequence of the operative movements of the three hydraulic actuators 26, 30 and 36.

From FIG. 1 it is also noted that the pressure chamber 12, further to being angularly oriented by an angle of 90° to the mixing chamber 19, is also angularly oriented with respect to the delivery conduit 31; in this manner, an arrangement is obtained of the common pressure chamber 12, of the mixing chamber 19 and the delivery conduit 31, according to three different axes or vectorial directions, which permits a better mixing degree of the polymeric components A, B and a great damping of the turbulence in the delivered flow of the resulting mixture.

Returning to FIGS. 3 to 6, the innovative features that are distinguishing the method and the mixing device according to the invention will be described in greater detail. In this connection, what mostly is distinguishing and characterizes the mixing device according to the present invention and the implemented method, consists of:

structurally configuring and operationally maintaining separate and differently oriented the pressure chamber 12 with the first cleaning element 20, from the mixing chamber 19 and a respective second cleaning member 28 suitable for throttling and adjustably setting the aperture of an elongated restriction of the co-injection orifice 27. In this manner, a correct positioning of fore end of the cleaning member 28 to throttle the elongated restriction of the co-injection orifice 27 is made possible, because it is no longer subjected to a dragging action by the cleaning member 20, and by the flow of the mixed polymeric components A, B, avoiding the generation of negative influences on the pressure of the unmixed polymeric components A, B inside the pressure chamber 12. Further, it is also made possible to proportionately reduce the length of the cleaning member 28 and of the mixing chamber 19 in respect to WO 2014/041494, consequently reducing the free inflexion length of the cleaning member 28 even with very small diameters of the mixing chamber, for example 1 mm, anyway less than 3.5 mm, reducing also the dimensions of the mixing device;

configuring the pressure chamber 12 with a forwardly convergent conical or differently shaped fore portion 12' so as to generate an acceleration of the flow of the unmixed polymeric components A, B through the co-injection orifice 27 and towards the mixing chamber 19;

intersecting a side wall of the mixing chamber 19, provided with an elongated restriction of the co-injection orifice 27, with the forwardly convergent or conical fore portion 12' of the pressure chamber 12, to provide an adjustably settable elongated restriction of the co-injection orifice 27, through which the polymeric components A and B, in an unmixed state are co-injected with great acceleration and kinetic energy from one side of the mixing chamber 19, impinging on the opposite side. In this manner it is possible to adjustably set open condition of the elongated restriction of the co-injection orifice 27 by setting the retracted position of the fore end of the second cleaning member 28, in respect to the same orifice 27, also during the mixing and delivering steps of the polymeric mixture.

Lastly, a further feature that is distinguishing the present invention, further to the transverse arrangement and the intersection of the mixing chamber 19 with the convergent fore portion 12' of the pressure chamber 12, consists of the possibility of configuring the mixing chamber 12 with a diameter D2 comparatively lower than the diameter D1 of the pressure chamber 12, maintaining a D1/D2 ratio comprised between 1.4 and 15 depending on the number of polymeric components to be mixed. In this manner, the polymeric components A, B that are in an unmixed state in the pressure chamber 12 are co-injected into a mixing chamber 12 of reduced dimensions, undergoing an impact and an angular deviation at the opposite side at an average speed that increases with the square of D1/D2 ratio. This enables the kinetic energy and the turbulence induced in the flow of co-injected reactive components A, B, to be exploited to the maximum and maintained by the disposition and the reduced section of the mixing chamber, obtaining an intimate mixture of the co-injected components.

The invention is thus directed to a self-cleaning mixing device, of the high-pressure type, able to operate with pressures for feeding the single polymeric components A, B lower than the feeding high-pressure normally required in conventional high-pressure mixing apparatuses, assuring at a same time, a constant control of the mixing degree also in the case of small flowrates, in the order of few grams/ second, for example 0.8 grams/second, or of a few tenths of gram/second, as well gradually varying the flowrates by maintaining a high-pressure drop between the pressure chamber and mixing chamber, e.g. above 40 bar (4 Pa), owing to the setting of the open section of the elongated restriction of the co-injection orifice 27, by retracted opening position of the second cleaning member 28.

Again with reference to the explanatory of FIGS. 3-6, in particular to FIG. 4, it is noted that the pressure chamber 12 has a forwardly converging fore portion 12', for example a conical portion or anyway configured converging towards a co-injection orifice 27 provided by a narrowed restricting having an open section that is adjustable by setting the position of the fore end of the cleaning member in the retracted position of the same cleaning member 28, to generate a great acceleration of the flow of the polymeric components A, B, in an axial direction transverse to the longitudinal axis of the mixing chamber 19, for example orthogonally oriented or forming an angle greater or less than 90° with respect to the longitudinal axis of the mixing chamber 19.

The length and the angle of convergence of the fore portion 12' of the cylindrical pressure chamber 12, and the interference degree between said convergent fore portion 12' and a side wall of cylindrical mixing chamber 19, can be selected and changed during the designing, with respect to what is shown, according to specific needs; for example good results have been obtained, as shown in FIG. 4, by providing a length and an interference degree of the fore portion 12' that is equal to or less than the radius of the mixing chamber 19, in which the convergence angle of the fore portion 12' can be equal to or greater than 40°, for example comprised between 40° and 180°, or less, according to the geometrical shape and D1/D2 ratio between the diameters of the pressure and mixing chambers, as will be explained in greater detail below with reference to the examples of FIGS. 7 to 12.

From FIGS. 3 and 4 it is further noted that the fore end of the cleaning and valve member 20 in turn is configured with a convergent or conical end portion 20' that conforms to the conical shape and convergence of the fore portion 12' of the pressure chamber 12; the end portion 20' of the cleaning member 20 is further configured with a cross cavity 20" that extends parallel to the axis of the mixing chamber 19, and has a curvature radius conforming to the curvature of the elongated restriction of the co-injection orifice 27 and the curvature radius of the internal surface of the side wall of the mixing chamber 19; thus in the advanced position of the cleaning member 20, the cavity 20" matches and closes the co-injection orifice 27 at one side of the mixing chamber 19, flush to an internal surface of the side wall, to enable the second cleaning member 28 to slide and eject the remaining mixture at the end of each mixing step.

It is also pointed out that the longitudinal axis of the mixing chamber 19 forms with the longitudinal axis of the pressure chamber 12 an angle that can be comprised between 15° and 165°.

The operation of the mixing device can be as follows: initially both the cleaning member 20 for the pressure chamber 12 and the cleaning member 28 for the mixing chamber 19 are in an advanced closure position; so the polymeric components A and B are recirculated by pumping device in the stoichiometrically requested quantities to respective storage tanks, through the slots 21, 22 in the first cleaning member 20 and the return conduits 23, 24. Subsequently, after retraction of the cleaning member 34 and retraction of the cleaning member 28 in a preset throttling position for setting the open section of the co-injection orifice 27 and adjusting the pressure of the unmixed components in the pressure chamber 12, the mixing device is opened; in this manner the polymeric components A, B are fed at the required high-pressure into the pressure chamber 12, where they flow at a same pressure in a substantially unmixed state along the pressure chamber (12), and the convergent fore portion 12' to the co-injection orifice 27. In the convergent fore portion 12' of the pressure chamber 12, the polymeric components A, B, still in a unmixed state and at a same pressure, undergo a great acceleration towards and through the settable open section of the restricted orifice 27, being in this manner co-injected and mixed under strong turbulence and great kinetic energy condition, transversely from a side wall of the mixing chamber 19 against the opposite side thereof where the components A, B are thoroughly and intimately mixed with one another.

From the mixing chamber 19, the resulting mixture flows into a delivery conduit 31 having a comparatively greater diameter D3, for example with a cross-section two or more times the cross-section of the mixing chamber 19, to be poured or injected into a mold or poured onto a substrate. Good results have been obtained by choosing a diameter D1 between 3.5 and 32 mm, and a diameter D2 between 1 and 10 mm, and choosing a diameter D3 between 4 and 45 mm.

The pressure of the polymeric components A and B in the common pressure chamber 12 and the kinetic energy of the co-injection jet, can be suitably controlled by narrowing the area of the open section of the co-injection orifice 27 by adjusting and setting the fore end of the cleaning member 28 in its retracted condition, in respect to the same co-injection orifice 27; as the second cleaning member 28 is physically and operatively separated from the first cleaning and valve member 20, the operative condition of the second cleaning member 28 for setting the co-injection orifice 27 is no manner influenced by the movement of the first cleaning member 20, by the control pressure of the hydraulic actuator and by the flowing mixture. The retracted operative position of the second cleaning member 28 for setting and throttling the co-injection orifice 27 can thus be stably maintained during operation of the mixing device, or adjusted by varying in relation to the total flowrate of delivered mixture, ensuring a constant control of the pressure inside the pressure chamber 12 and, consequently, a constant control of the mixing degree of the polymeric components A and B.

In this regard, the correct positioning of the second cleaning member 28 in the retracted condition for setting and throttling the co-injection orifice 27, can be controlled and adjusted in an extremely simply mode, for example by providing an adjustable stop member or stop means 37 for the piston 29 of the hydraulic actuator 30, the axial position of which, in the example shown, can be simply changed by screwing and locking the piston 29 in a desired position, for example by a screw 38, or with any other locking devices suitable for this purpose. The stop means 37 can therefore be configured in any way, providing a manual or automatic adjusting system, as explained further on.

According to the invention, the mixing method accelerates, makes turbulent and maintains in a turbulent state the flow of polymeric components which are co-injected in an unmixed condition into the mixing chamber, by varying and setting the restriction of the co-injection orifice 27, to generate a pressure drop between the pressure chamber 12 and the mixing chamber 11 equal to or greater than 40-60 bar (4-6 MPa).

It has been said that the end portion 20' of the cleaning member 20 and fore portion 12' of the pressure chamber 12 can have any mating and converging configuration, so as to permit in the totally advanced position of the cleaning member 20, a mating contact of the convergent end portion of the same cleaning member 20 with the fore portion 12' of the pressure chamber 12. In the example in FIGS. 1 to 6 a conical configuration has been shown in which the length of the fore portion 12' of the pressure chamber 12 is equal to the radius of the same mixing chamber 19, with a convergency angle greater than 90°; in fact, the length and the convergency angle of the fore portion 12' of the pressure chamber 12 can also be varied with respect to what has been shown.

Figure 7:
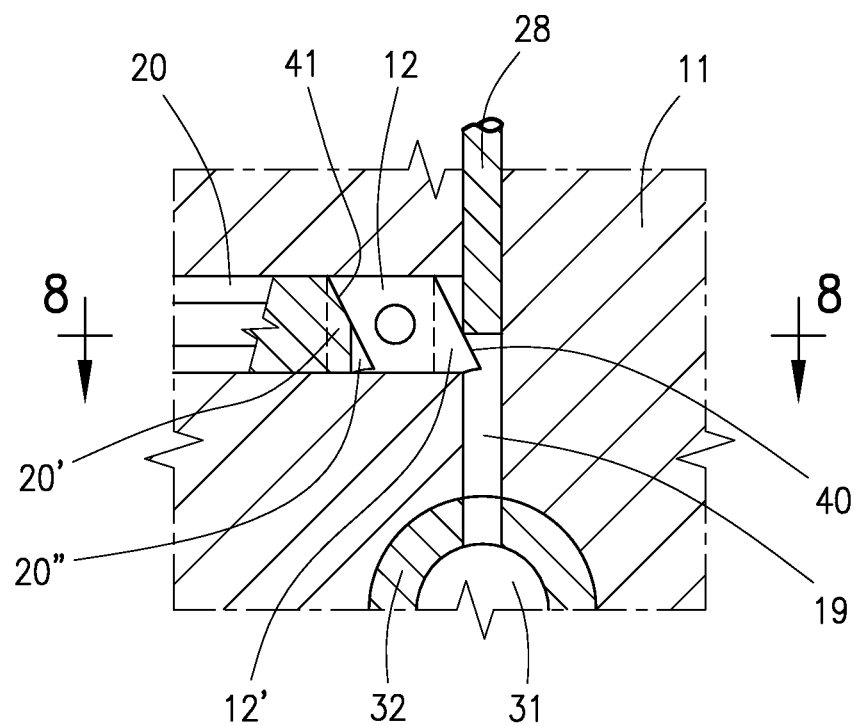
FIG. 7 is showing the cleaning and valving member for the pressure chamber, seen according to line 7-7 of FIG. 8.
Figure 8:
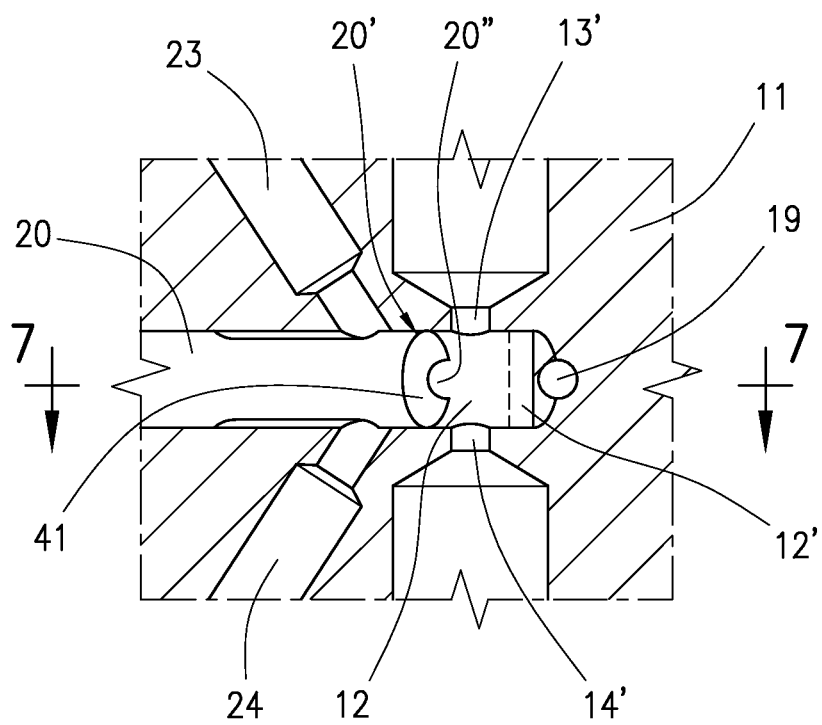
FIG. 8 is a sectional view, according to line 8-8 of FIG. 7.

FIGS. 7 and 8 show a second possible convergent shape of the fore portion 12' of the pressure chamber 12, of the end portion 20' of the cleaning member 20, and of the convergence angle. In FIGS. 7 and 8 the same reference numbers have been used as in the previous figures to indicate similar or equivalent parts; further, for reasons of simplicity, some parts have been omitted.

From the aforesaid figures, it is noted that the fore portion 12' of the pressure chamber 12 is configured with a flat surface 40, rearwardly slanted with respect to the longitudinal axis of the chamber 12, which forms with respect to this axis a convergence angle equal to or greater than 30°, for example between 30° and 90°.

The mixing chamber 19 is again oriented transversely and partially intersects the fore portion 12' of the pressure chamber 12, forming a narrowed elongated restriction of the injection orifice for the co-injection of the polymeric components A, B, in an unmixed condition.

In a completely similar manner, also the end portion 20' of the cleaning member 20 terminates with a similarly flat slanting surface 41, to come into a mating contact with the slanted flat surface 40 of the forwardly converging fore portion of the pressure chamber in the totally advanced condition of the cleaning member 20, to eject the remaining unmixed components A, B from the pressure chamber 12 at the end of each mixing step.

Figure 9:
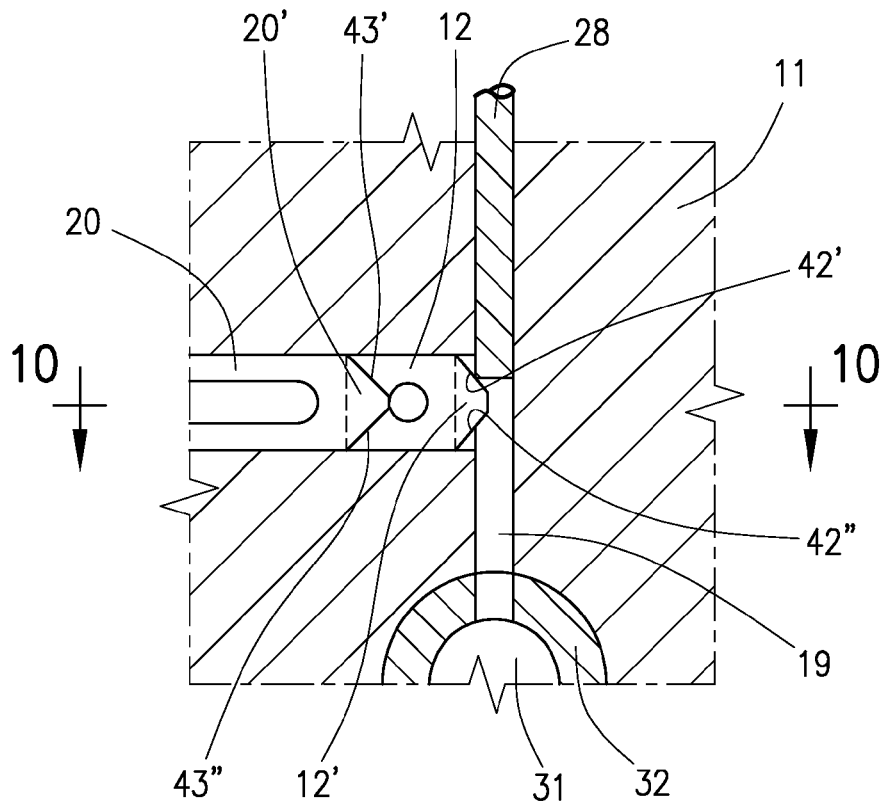
FIG. 9 is a second embodiment of the cleaning and valving member for the pressure chamber, seen according to line 9-9 of FIG. 10.
Figure 10:
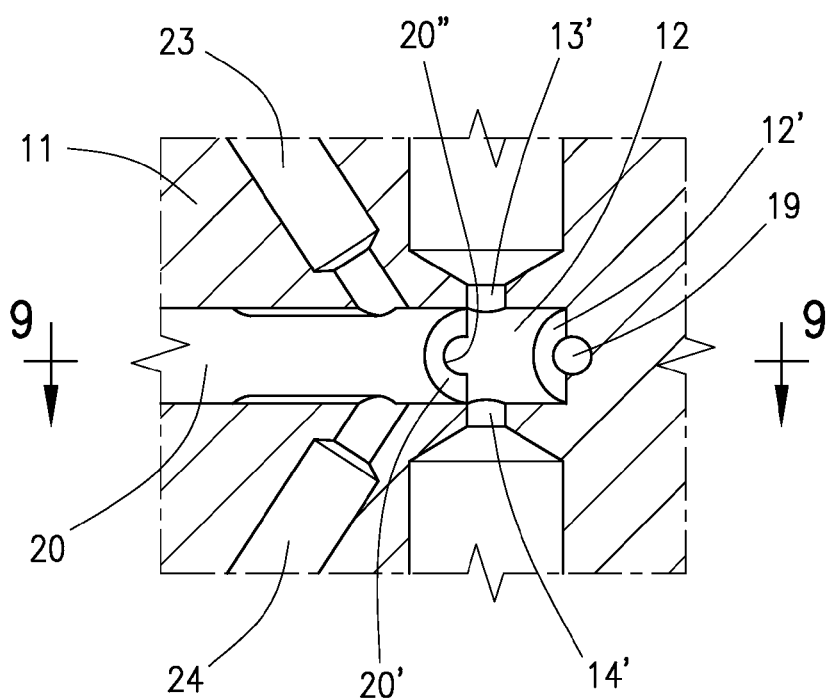
FIG. 10 is a sectional view, according to line 10-10 of FIG. 9.

FIGS. 9 and 10 show a third converging shape of the fore portion 12' of the pressure chamber 12, of the end portion 20' of the cleaning member 20, and the respective convergence angle. In FIGS. 9 and 10 the same reference numbers have again been used as in the previous examples to indicate similar or equivalent parts; further, some parts have been omitted again.

The solution of FIGS. 9 and 10 differs from the preceding solutions because now both the fore portion 12' of the pressure chamber 12 and the end portion 20' of the cleaning member 20 are configured with two flat oppositely slanted surfaces 42', 42", respectively 43', 43", which are converging forwards in respect to the longitudinal axis of the pressure chamber 12, and towards the co-injection orifice 27, forming a convergence angle equal to or greater than 40°, for example comprised between 40° and 180°. Again, in FIGS. 9 and 10, with the reference number 20" a semicylindrical cavity has been shown at the end portion 20' of the cleaning member 20, that conforms to the co-injection orifice, and to the curvature radius of the side wall of the mixing chamber 19, in which the cavity 20" is oriented transversely to the two slanted surfaces 43' and 43", and extends again parallel to the longitudinal axis of the mixing chamber 19.

Figure 11:
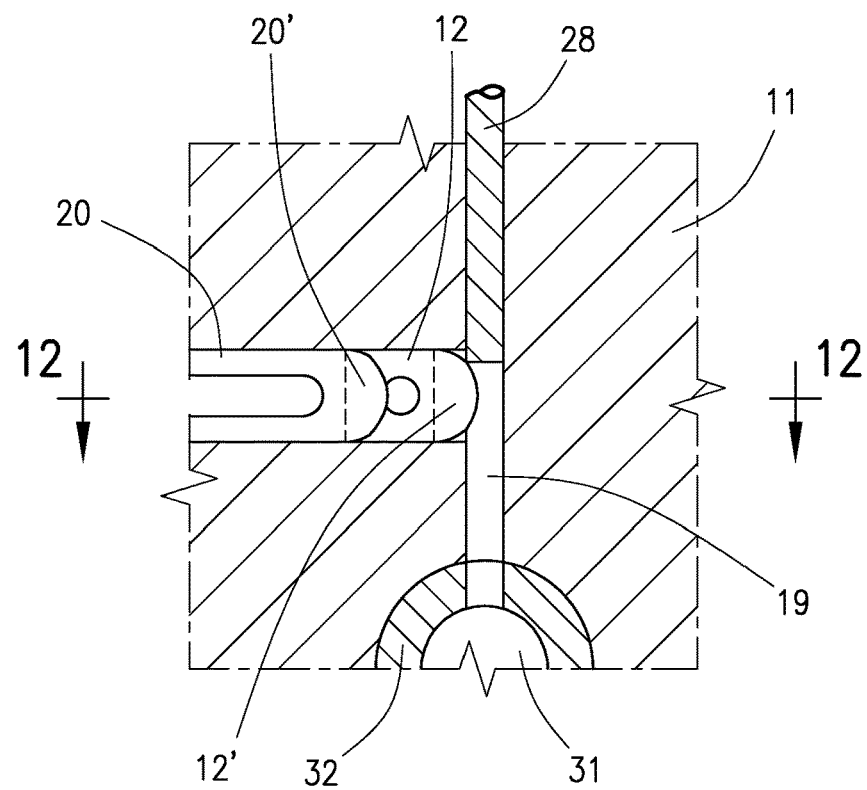
FIG. 11 is a third embodiment of the cleaning and valve member for the pressure chamber, seen according to line 11-11 of FIG. 12.
Figure 12:
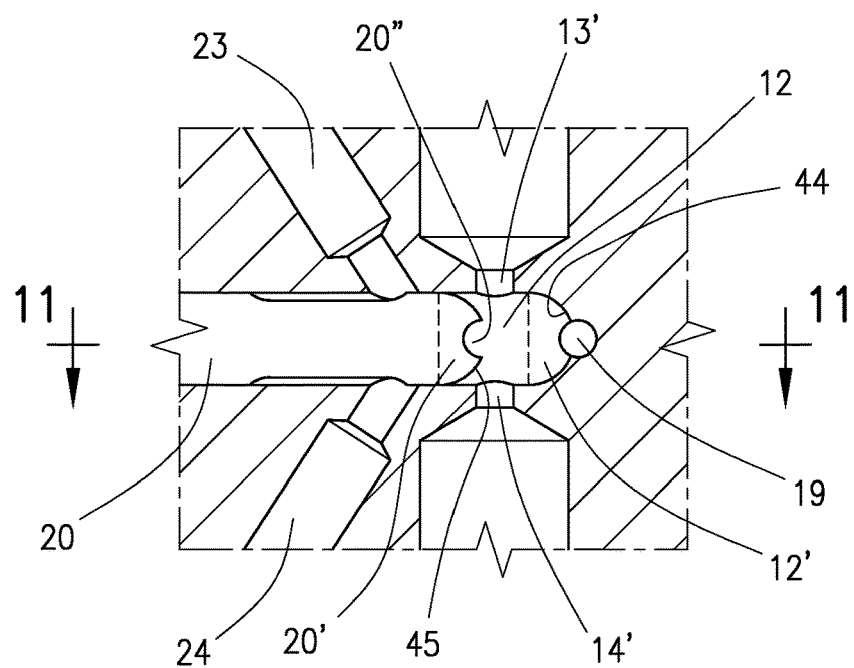
FIG. 12 is a sectional view, according to line 12-12 of FIG. 11.

FIGS. 11 and 12 show a fourth solution that differs from the preceding ones inasmuch as the forwardly converging fore portion 12' of the pressure chamber 12, and the end portion 20' of the cleaning member 20, are configured by a semispherical surface 44 and respectively 45, having a same curvature radius; on the other hand, also the solution of FIGS. 11 and 12 comprises the features and operates in the same manner as the previous solutions. Accordingly, also in FIGS. 11 and 12 the same reference numbers as for the preceding figures have been used again to indicate similar or equivalent parts.

Figure 13:
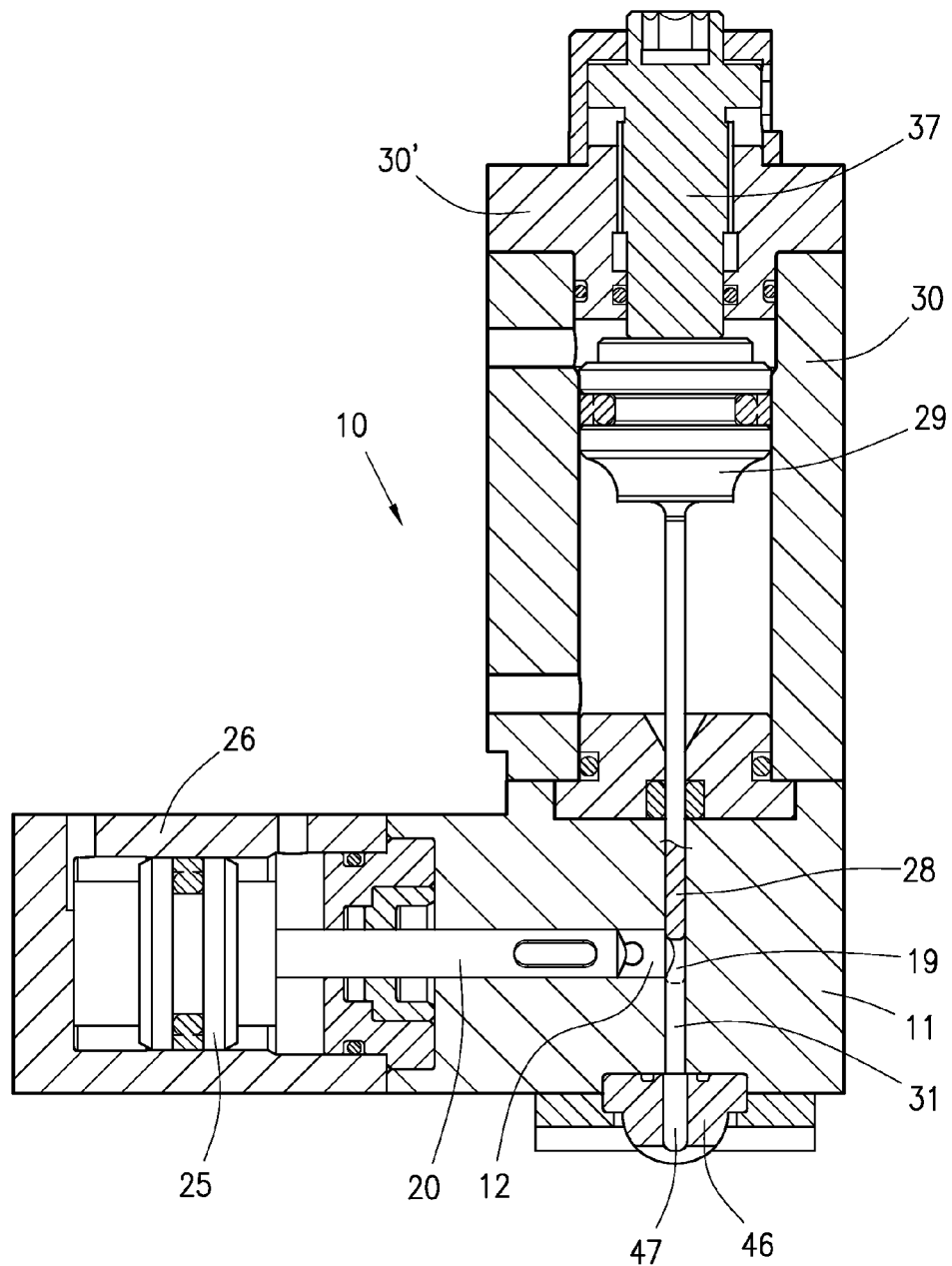
FIG. 13 shows a second embodiment of the mixing device according to the invention, provided with a self-cleaning spray nozzle, and with a throttling device for setting the restriction of the injection orifice, which is manually adjustable.

FIG. 13 of the drawings shows a second embodiment of a mixing device 10 according to the invention; in FIG. 13 the same reference numbers as for the preceding figures have been used again to indicate similar or equivalent parts.

In the previous case of FIGS. 1 and 2, the mixing device 10 was provided with a pressure chamber 12, with a mixing chamber 19 and with a delivery conduit 31 angularly oriented according to three different vectorial axes. The solution of FIG. 13, maintaining all the innovative features of the method and of the mixing device of FIGS. 1 to 6, differs inasmuch as now the delivery conduit 31 is axially aligned and constitutes an extension of the same diameter as the mixing chamber 19; the delivery conduit 31 furthermore terminates with a spray nozzle 46 of the self-cleaning type. Thus the cleaning member 28 extends over the entire length of the mixing chamber 19 and the delivery conduit 31, up to the exit hole 47 of the spray nozzle 46. For the remaining, the mixing device of FIG. 13 has the same innovative features and operates in a very similar manner to the devices previously disclosed.

In a manner substantially corresponding to that of FIG. 2, the high-pressure mixing device of FIG. 13 is again provided with stop means 37 for the piston 29 of the hydraulic actuator 30 of the cleaning member 28 that sequentially performs the setting of the pressure in the pressure chamber, the cleaning of the mixing chamber 19, the delivery conduit 31 and the exit hole 47 of the spray nozzle 46, and in which the stop means 37 can be manually adjusted by screwing in a threaded hole provided at the rear head 30' of the hydraulic actuator 30.

Figure 14:
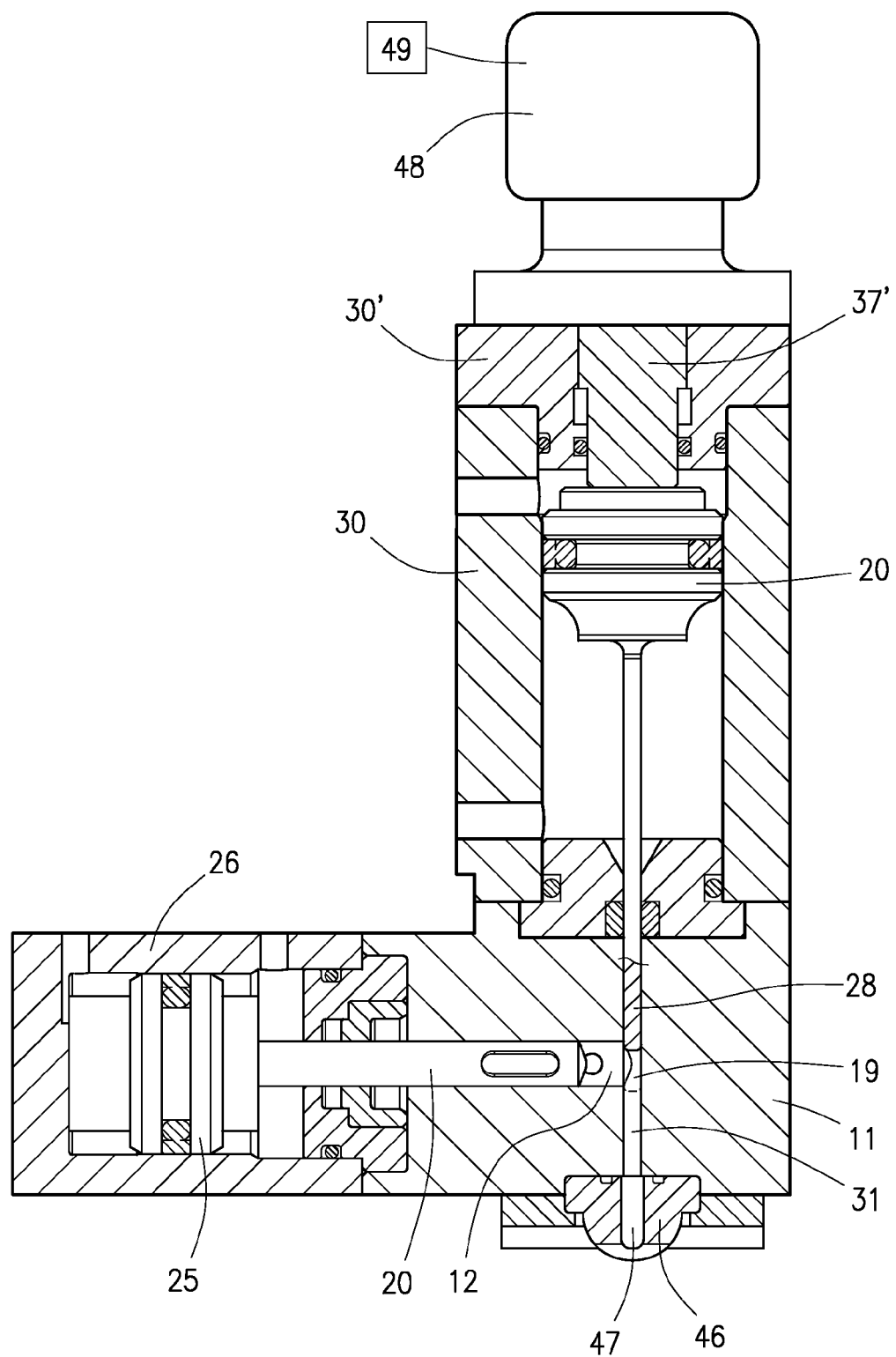
FIG. 14 shows a mixing device similar to that of FIG. 13, provided with a throttling device for setting the restriction of the injection orifice, which is automatically adjustable.

Alternatively to the use of the manually adjustable stop means 37 of FIG. 13, it is possible to use a stop means which is automatically adjustable, as shown in FIG. 14, substantially consisting of a slider 37', axially guided into the rear head 30' of the hydraulic actuator 30; the slider 37' is operatively connected to an actuator 48 consisting, for example, of an electric or hydraulic actuator. The actuator 48 is operatively connected to a control unit 49 configured for calculating and setting the cleaning member 28 in a preset adjusted position; the control unit 49 is able to perform a predictive calculation of the retracted position of the cleaning member 28 to open and throttle the co-injection orifice 27, both preliminarily, i.e. before delivering the reactive mixture, and during the same delivering step.

The spray nozzle 46 and the cleaning member 28 can be configured differently; certain embodiments of the spray nozzle 46 and the cleaning member 28 are shown by way of example in FIGS. 15 to 20.

Figure 15:
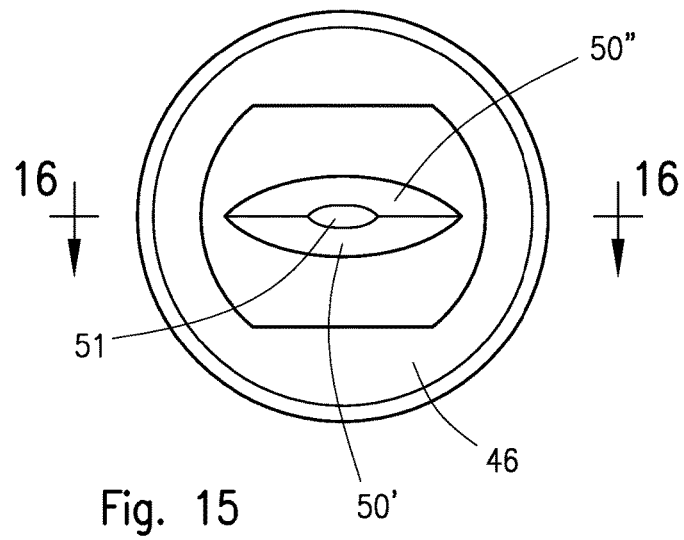
FIG. 15 is a view of the spray nozzle of the device of FIGS. 13 and 14, seen according to line 15-15 of FIG. 16.
Figure 16:
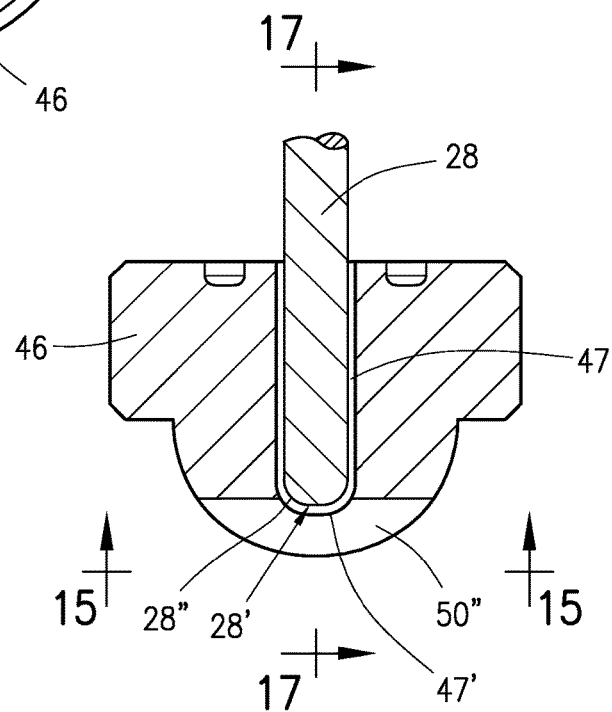
FIG. 16 is a sectional view according to line 16-16 of FIG. 15.
Figure 17:
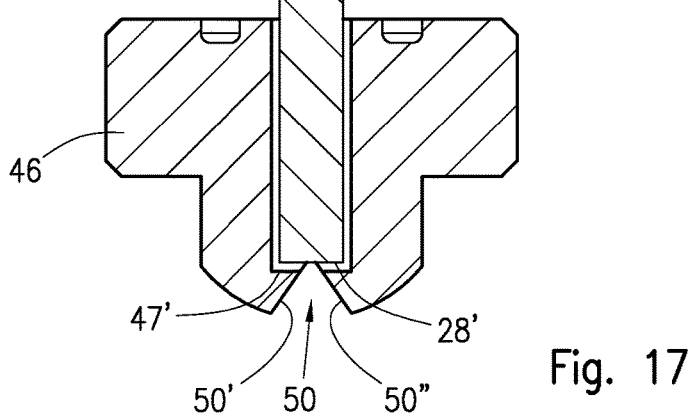
FIG. 17 is a sectional view according to line 17-17 of FIG. 16.

As shown in FIGS. 13, 14 and in FIGS. 15, 16 and 17, the nozzle 46 is configured with an axial bore 47 that is axially aligned to the mixing chamber 19 and to the delivery conduit 31; the axial bore 47 partially intersects a V-shaped transverse cut 50 having two divergent flat walls 50' and 50" that extend from a narrowed orifice 51, FIG. 15, to the lower end of the bore 47.

In particular, as schematically shown, the fore end 28' of the cleaning member 28, in the advanced position of the latter come into contact and is matching the internal shaped surface of the lower end 47' of the bore 47, at the orifice 51, as shown in FIGS. 16 and 17, where the space between the cleaning member 28 and the bore 47, for reasons of clarity, has been deliberately enlarged. In this manner a self-cleaning high-pressure mixing device is obtained, of the type disclosed, provided with a self-cleaning spray nozzle 46 that does not require the use of air jets to be cleaned, inasmuch as it is able to eject all the residual mixture in the mixing chamber 19 and in the bore 47 of the nozzle 46.

Figure 18:
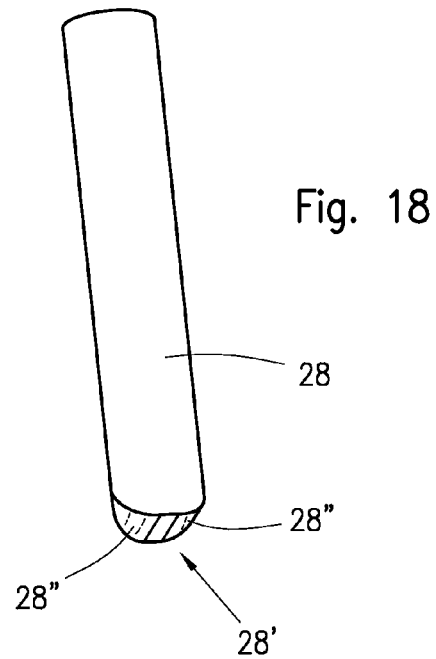
FIGS. 18, 19 and 20 show perspective views of three possible solutions for of the cleaning member for the mixing chamber and for throttling and setting the restriction of the injection orifice.

The end 28' of the cleaning member 28 intended to come into contact with and matching the shaped inside end of the bore 47, can have any conformation; for example in FIGS. 16, 17 and in the detail of FIG. 18, the end 28' of the cleaning member 28 is conformed as a cap having, on two sides, a semicylindrical surface 28" the axis of which is oriented orthogonally to the longitudinal axis of the cleaning member 28.

Figure 19:
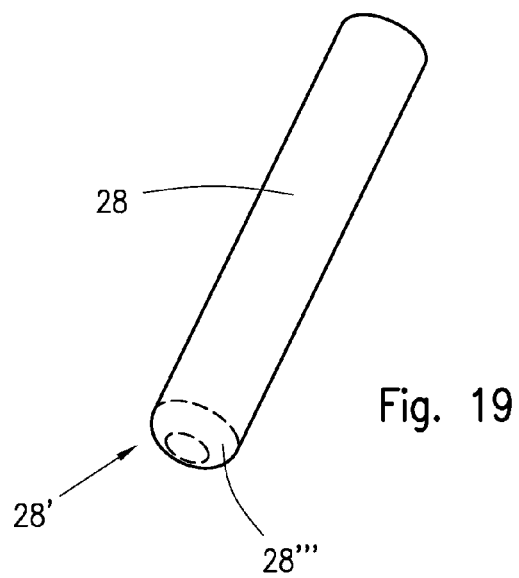
Figure 20:
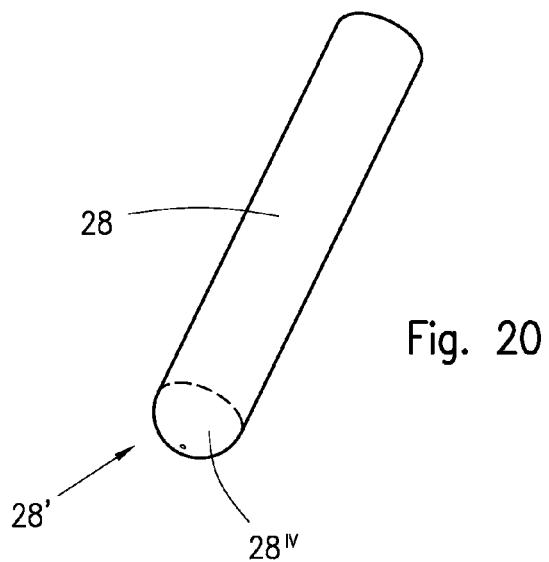

Lastly, FIGS. 19 and 20 show two further embodiment of the fore end 28' of the cleaning member 28, also intended to come into contact with and conform to a suitable shaped surface inside the bore 47.

In particular in FIG. 19 the end 28' of the cleaning member 28 is configured again as a cap 28''' with a toric shape, that substantially consists of a quarter torus; otherwise, according to the solution of FIG. 20, the fore end 28' of the cleaning member 28, terminates with a spherical cap 28$^{IV}$ which, as in the preceding examples, is meshing to the cylindrical surface of the cleaning member 28.

It is thus clear that the mixing device according to the invention is further characterized by comprising a mixing chamber 19 that extends in a cylindrical delivery conduit provided with a self-cleaning spray nozzle for a resulting polymeric mixture, in which the cleaning member of the mixing chamber, in the advanced position thereof, extends in the delivery conduit and through an eject bore of the spray nozzle, configuring the fore end of the cleaning member of the mixing chamber with a shape that conforms to and match an internal surface of the ejection bore.

It is nevertheless understood that what has been said and shown with reference to the attached drawings has been provided merely by way of example of the general features of the mixing device and of the method according to the invention, and of some preferential embodiments thereof. Thus other modifications or variations can be made to the method, to the mixing device and/or parts thereof, without thereby departing from the claims.

What we claim is:

1. A method for mixing a first and at least a second polymeric reactive component by a self-cleaning high-pressure mixing device comprising the steps of:
    configuring the mixing device with a pressure chamber having a forwardly converging fore portion in fluid communication with a mixing chamber through a settable co-injection orifice consisting of an elongated restriction;
    a first cleaning member for the pressure chamber and a second cleaning member for the mixing chamber; each of first and second cleaning members having a fore end and being reciprocable between an advanced and a retracted position;
    feeding the first and at least the second polymeric reactive components into the pressure chamber maintaining the polymeric reactive component inside the pressure chamber at a same high pressure and in an unmixed state;
    flowing the polymeric reactive components at said high pressure and in the unmixed state, from the pressure chamber to said forwardly converging fore portion to increase the flowing velocity of the unmixed first and second polymeric reactive components;
    setting an open section of the elongated restriction of the co-injection orifice by adjusting the position of the fore end of the second cleaning member in respect to the same co-injection orifice, to adjust the high pressure of the unmixed polymeric reactive components in the pressure chamber;
    co-injecting the unmixed polymeric reactive components into the mixing chamber, causing a pressure drop and a mixing of the polymeric reactive components into a resulting reactive mixture, while the reactive components are flowing through the elongated restriction of the set open section of the co-injection orifice and into the mixing chamber of the mixing device; and
    ejecting the remaining unmixed polymeric reactive components from the pressure chamber and from the forwardly converging fore portion, as well as ejecting the remaining reactive mixture from the mixing chamber, by sequentially moving the first and the second cleaning members in their advanced position in the pressure chamber, respectively in the mixing chamber of the mixing device.

2. The method according to claim 1, wherein a pressure drop equal to or greater than 40 bar is provided between the pressure chamber and the mixing chamber by changing the open section of the co-injection orifice to generate turbulent conditions in the flow of the unmixed polymeric reactive components awhile they are injected into the mixing chamber through the co-injection orifice.

3. The method according to claim 2, wherein the open section of the co-injection orifice is changed by adjusting the position of the fore end of the second cleaning member in the retracted position of the second cleaning member.

4. A self-cleaning high-pressure mixing device suitable for mixing polymeric reactive components in a resulting reactive mixture, comprising:
    a cylindrical pressure chamber having a first diameter D1 and a forwardly converging fore portion;
    a cylindrical mixing chamber having a second diameter D2 comparatively smaller than the first diameter of the pressure chamber;
    the forwardly converging fore portion of the pressure chamber being in fluid communication with the mixing chamber through a settable co-injection orifice;
    first and second cleaning members each having a fore end, the first and second cleaning members being reciprocable in the pressure chamber respectively in the mixing chamber between a retracted and an advanced condition; and
    hydraulic actuators to sequentially reciprocate the first and second cleaning members;
    the settable co-injection orifice consisting of an elongated restriction longitudinally extending on a side wall of the mixing chamber the elongated restriction being transversely oriented to and intersecting the forwardly converging fore portion of the pressure chamber;
    the mixing device comprising an adjustable stop element for the second cleaning member, the stop element being, configured to provide an open section of the elongated restriction to adjust a high pressure of the unmixed polymeric reactive components in the pressure chamber, by setting the fore end position of the second cleaning member in the retracted condition, in respect to the elongated restriction of co-injection orifice.

5. The high-pressure mixing apparatus according to claim 4, wherein the first diameter D1 of the pressure chamber and the second diameter D2 of the mixing chamber have a ratio D1/D2 comprised between 1.4 and 15.

6. The high-pressure mixing device according to claim 4, wherein the forwardly converging fore portion of the pressure chamber and a forwardly converging end portion of the first cleaning member of the pressure chamber have a convergence angle comprised between 40° and 180°.

7. The high-pressure mixing device according to claim 6, wherein the forwardly converging fore portion of the pressure chamber and the fore end of the first cleaning member intended to come into contact with one another, are configured with a forwardly slanted flat surface with respect to the co-injection orifice, by an angle comprised between 30° and 90°.

8. The high-pressure mixing device according to claim 6, wherein the forwardly converging fore portion of the pressure chamber and the fore end of the first cleaning member intended to come into contact with one another, are configured with mating conical surfaces.

9. The high-pressure mixing device according to claim 6, wherein the forwardly converging fore portion of the pressure chamber and the fore end portion of the first cleaning member intended to come into contact with one another, are configured with two opposite mating flat surfaces, forwardly converging towards the co-injection orifice, by an angle comprised between 40° and 180°.

10. The high-pressure mixing device according to claim 4, wherein the forwardly converging fore portion of the pressure chamber and the fore end portion of the first cleaning member are configured with matching semi spherical surfaces.

11. The high-pressure mixing device according to claim 4, wherein the second cleaning member of the mixing chamber is movable between an advanced closure position, a retracted opening, and a throttling position for the co-injection nozzle; and comprises a manually or automatically adjustable stop element for stopping the second cleaning member of the mixing chamber, in the retracted position for setting the open section of the co-injection orifice.

12. The high-pressure mixing device according to claim 4, wherein the pressure chamber, the mixing chamber and a delivering conduit are oriented according to three different vector directions.

13. The high-pressure mixing device according to claim 4 wherein the diameter of the second cleaning member and of the mixing chamber is at least one half the diameter of the pressure chamber.

14. The high-pressure mixing device according to claim 4, wherein the longitudinal axis of the mixing chamber forms, with the longitudinal axis of the pressure chamber, an angle comprised between 15° and 165°.

15. The high-pressure mixing device according to claim 4, comprising a delivery conduit for the resulting mixture, axially aligned to the mixing chamber, and to a self-cleaning spray nozzle.

16. The high-pressure mixing device according to claim 15, wherein the second cleaning member for the mixing chamber is movable between the retracted position for setting the open section of the co-injection orifice, and the advanced closure position in which the second cleaning member extends into the axially aligned mixing chamber, the delivery conduit and the spray nozzle.

17. The high-pressure mixing device according to claim 16, wherein the second cleaning member for the mixing chamber, the delivery conduit and the spray nozzle, is configured with a fore end conforming to an internal surface of an exit hole of the spray nozzle.

18. The high pressure mixing device according to claim 4, in which the mixing chamber axially extends in a cylindrical delivery conduit provided with a spray nozzle having an injection hole for ejecting the resulting polymeric reactive mixture, wherein the second cleaning member of the mixing chamber, in the advanced condition of the same second cleaning member, extends in the delivery conduit and through the an ejection hole of the spray nozzle, the fore end of the second cleaning member conforming to an internal surface of the ejection hole.

* * * * *